128-24.A

55

Nov. 25, 1958 J. KOZINSKI 2,861,564

THERAPEUTIC PULSING SYSTEM

Filed March 28, 1955

INVENTOR.
Joseph Kozinski.
BY Robert L Kahn
Atty.

United States Patent Office 2,861,564

Patented Nov. 25, 1958

2,861,564

THERAPEUTIC PULSING SYSTEM

Joseph Kozinski, Chicago, Ill., assignor to H. G. Fischer & Co., Franklin Park, Ill., a corporation of Illinois Application March 28, 1955, Serial No. 496,995

4 Claims. (Cl. 128—24)

This invention relates to a control means for pulse generators having particular application to medical work but useful in other fields.

Therapeutic applications of energy in the form of super audible frequency are common and useful for a variety of conditions. As a rule, frequencies of the order of about one million cycles may be useful in the treatment of certain disorders and conditions. The energy is applied by means of a crystal oscillator resting at the affected area to be treated.

It has been found that such super audible energy may be beneficially applied at comparatively high energy levels provided, however, that the crystal is pulsed and is not continuously energized. Thus as an example, it is common to radiate power at a rate as much as 5, 10 or even 20 watts of sound energy from such crystal oscillators during the time that the crystal is energized. In order to maintain a tolerable average energy radiation, it has been customary to pulse the oscillator supplying the crystal for predetermined periods of time. Thus a common pattern of operation provides for a pulse repetition rate of the order of about 100 per second with the oscillator on for about .001 second for each pulse. It is understood that a pulse may be of the envelope of a train of high frequency waves. For example, an oscillator operating for .001 second at a frequency of 1,000 kc. will generate 1,000 cycles in .001 second, disregarding the transient effects at the start. It has also been found that the wave shape of the pulse is important and that it is particularly desirable to maintain a square wave.

It is desirable to vary the duration of energization of the oscillator for each pulse in order to control the level of average energy supplied by the oscillator. As a rule, the duration of an oscillator energization may range from a maximum of about .002 second to a minimum of about .0005 second. Within this range it is desirable to vary the pulse duration accurately and to insure that the duration time remains accurate for the adjusted value.

This invention provides means whereby an oscillator may be pulsed accurately for predetermined periods of time in a super audible frequency generator for medical work. Furthermore, this invention provides a system whereby the oscillator circuit is controlled in a novel manner so that the oscillator in a standby condition will promptly initiate oscillations when desired.

As is well known, a crystal has a very high Q, this being the ratio of energy stored to energy dissipated. Because of the high Q of the crystal, a crystal will continue oscillations for some time after cessation of oscillations from a vacuum tube oscillator. Conversely, a quiet crystal will require a substantial number of cycles from an oscillator to be fed to the crystal before the crystal will oscillate at suitable amplitude. By virtue of the invention, a vacuum tube oscillator is maintained continuously in oscillation, even during standby periods, but operating at a low energy level and failing to supply high frequency energy to the crystal at a level required for maintaining continuous oscillations. By virtue of this, when the oscillator tube is pulsed, the tube oscillator will go into oscillations at desired amplitudes and otherwise will oscillate at relatively low amplitudes when the crystal load is not to be energized.

The means for controlling the duration of oscillator activity may assume a variety of forms and in general comprises simple brush mechanism operating in cooperation with a rotary switch. By varying the relative position of one of two brushes with respect to a segment on a rotating drum, it has been found that a precise and convenient control over the closure time of a switch may be exercised and thus a precise and close control over the active and inactive periods of an oscillator may be obtained.

For a full understanding of the invention, reference will now be made to the drawings wherein various exemplary constructions embodying the invention are illustrated, it being understood, however, that variations may be made without departing from the scope of the invention except as defined by the appended claims.

In the drawings, Figure 1 is a showing partly diagrammatic and partly structural of a system embodying the present invention.

Figures 1, 2, 3, 4, 5:
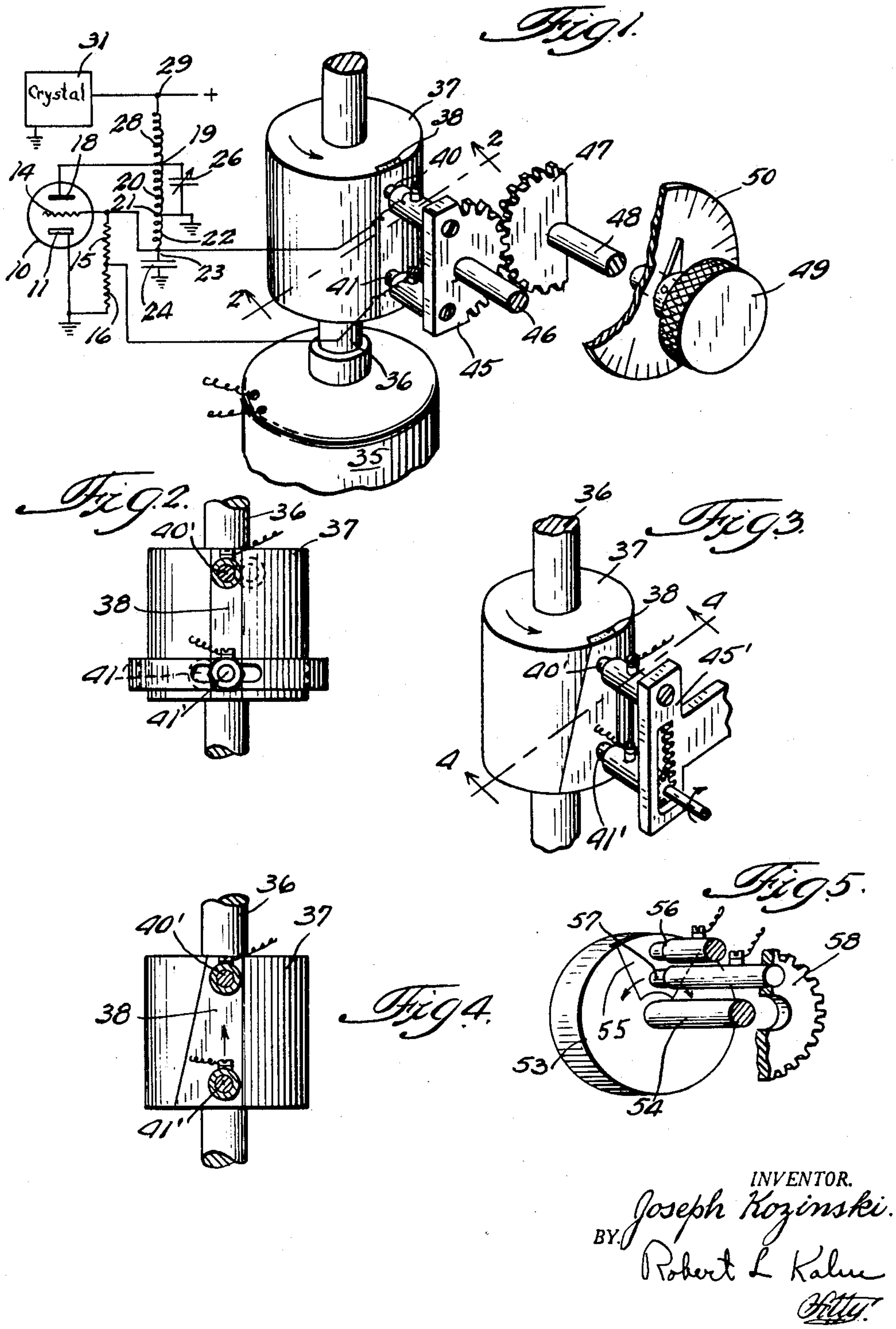
Figure 2 is a detail showing the switch mechanism in Figure 1 and the range of control possible with such mechanism.
Figure 3 illustrates a modification of the switch mechanism.
Figure 4 is a detail of the switch mechanism illustrated in Figure 3.
Figure 5 shows a further modification of the switch mechanism.

Referring first to Figure 1, any suitable type of oscillator of the vacuum tube type may be provided. Such an oscillator may consist of one vacuum tube or a pair of vacuum tubes in push-pull relation. Inasmuch as oscillator circuits are well known, a simple circuit will be illustrated, it being understood, however, that variations thereof may be made. Referring therefore to the circuit, vacuum tube 10 has cathode 11 which is grounded. Vacuum tube 10 has control grid 14 which is connected to ground through a pair of resistors 15 and 16 in series. Vacuum tube 10 has anode 18 connected to junction 19. Junction 19 has connected thereto inductance 20 having terminal 21 grounded. Inductance 22 is connected between junctions 21 and 23, the latter being grounded for high frequency by means of condenser 24. Terminal 23 is connected to control grid 14 of vacuum tube 10. Shunted across inductance 20 is tuning condenser 26, this condenser being variable. It is understood that inductances 20 and 22 are magnetically coupled together for regenerative action.

Magnetically coupled to inductances 20 and 22 is load inductance 28, this inductance being connected to terminal 19 and having terminal 29 available for connection to the positive terminal of a suitable source of potential. This source of potential is used for energizing the anode circuit of the vacuum tube, the other terminal of this source of potential being grounded in the usual fashion.

Connected between ground and junction 29 is the oscillator load consisting of crystal 31. Crystal 31 may consist of a variety of substances, the preferred material usually being of quartz. As is well known, the crystal is grounded and is suitably disposed with respect to electrodes so that the crystal will oscillate at a suitable frequency.

The various circuit parameters are so selected that crystal 31 will oscillate at a desired super audible frequency such as, for example, about one million C. P. S. This frequency may be varied somewhat by tuning condenser 26. The value of the oscillator frequency is exemplary and other values either above or below the value given may be utilized as desired.

Resistors 15 and 16 connected between the control grid and ground of tube 10 have such a value that when both resistors 15 and 16 are present, vacuum tube 10 will oscillate weakly. However, when resistor 15 is short-circuited, resistor 16 will provide just enough of a leak for the grid circuit so that vacuum tube 10 will oscillate vigorously at the desired frequency. It is only when resistor 15 is short-circuited that the system operates to provide high frequency energy to crystal 31 at a sufficient level so that the crystal will oscillate and be capable of supplying high frequency oscillatory energy to an affected area for medical treatment.

The means for switching resistor 15 in and out of the given circuit will now be described. The mechanism comprises motor 35 having drive shaft 36 upon which there is secured insulating drum 37. Disposed within a recess longitudinally of the surface of drum 37 is conducting strip or segment 38. While only one segment 38 is shown, there may be as many segments as desired, this depending upon the speed of rotation of drum 37 and the number of circuit closures required per minute. Segment 38 may be of brass or copper, the outer surface of the segment being generally flush with the cylindrical surface of drum 37.

Bearing upon the surface of drum 37 are brushes 40 and 41 carried by suitable brush holders. These brushes may consist of either circular or rectangular rods of graphite or other material used in electric motors and generators. Brushes 40 and 41 are connected by wires across resistor 15. Instead of switching resistor 15 in and out of the circuit, it is possible to switch resistor 16, in which case a ground wire would be part of the connecting wires between the brushes and resistor. Other circuits utilizing other impedances as capacitors, inductors in appropriate parts of the oscillating system may be used.

Brushes 40 and 41 and the brush holders are carried by mutilated gear 45 suitably secured in a support not shown, gear 45 being mounted for rotation with respect to shaft 46. Meshing with gear 45 is actuating gear 47 having shaft 48. Shaft 48 carries knob 49 cooperating with dial 50. If desired, gear 47 and shaft 48 may be omitted and instead the knob and dial may be mounted in suitable relation to shaft 46. In such case, mutilated gear 45 need only be a block upon which the brush holders are supported.

Conducting segment 38 has a width at least as great as the transverse dimension of each brush 40 and 41 and preferably the width of segment 38 is somewhat greater than the diameter or width (depending upon whether the brush is cylindrical or rectangular) of the brushes. As illustrated in Figure 2, a parallel alinement of the brushes with respect to shaft 36 will result in a maximum circuit closure time resulting from the contact of the two brushes on conducting segment 38 during turning of drum 37. Rotation of support 45 carrying the brush holders so that the brushes are askew or disposed at an angle to shaft 36 will result in a reduction of the time during which a circuit is established between the brushes by way of conducting segment 38. It is understood that brushes 40 and 41 are spring pressed against the surface of drum 37 and that in practice, the angle through which the brushes may be rotated will be small, the maximum angle of deviation between the line joining the brushes and axis 36 being of the order of about 10 or possibly 15 degrees. The angle of deviation is equivalent to an angle of lag or lead between brushes. Thus by controlling the relative positions of brushes and segment, the duration of simultaneous dwell of brushes on segment 38 will be controlled. This in turn will control the nature of the switching cycle for resistor 15 or any impedance circuit element. By having the diameter of drum 37 large in comparison to the diameter or transverse dimension of the brushes—in other words, by increasing the radius of curvature of the cylindrical surfaces contacting the brushes—a greater increase in the maximum angle of deviation is obtainable. In practice, there will be some variation in the area of brush contact as the brush angle increases from the position illustrated in Figures 1 and 2.

Referring to Figure 2, there is shown a modification wherein brush 41′ is moved along a line generally perpendicular to the axis of shaft 36 and parallel to the surface of drum 37. In this modification, the support for one of the brushes here illustrated as 41′ is generally curved parallel to the surface of drum 37 and means are provided for shifting the angular position of brush 41′ with respect to brush 40′. In such construction, preferred brush contact may be maintained at all times and the duration of circuit closure between the two brushes may be varied by offsetting one brush with respect to the other.

Inasmuch as the current handled by conducting strip 38 and the two brushes is small, of the order of a small fraction of an ampere—and since the value of resistance 15 and resistance 16 will each be large in comparison to any brush resistance variation due to movement of the brushes in either Figure 1 or Figure 2—the construction illustrated in Figure 1 will work out in practice as well as the construction illustrated in Figure 2. The actual duration of circuit closure between the brushes will be a function of the speed of rotation of drum 37, the width of segment 38, the diameter or width of the brushes along a line generally perpendicular to shaft 36, and the amount of offset. In the construction illustrated in Figure 1, the angle of deviation between the brushes will affect the circuit closure time by a factor involving the cosine of the angle. In the construction illustrated in Figure 2, however, the angle of deviation will be directly proportional to the circuit closure time duration.

Referring now to Figure 3, a still further modification is illustrated wherein conducting segment 38 does not have a constant width but tapers in width along the length thereof. Brush 40′ is maintained stationary in this form while brush 41′ may be moved to or from brush 40′. It is clear that by moving brush 41′ toward brush 40′ the duration of circuit closure will be reduced. In this modification, the variation of circuit closure will be a function of the taper of conducting segment 38.

It is possible to provide a still further modification by combining the constructions of Figure 1 or 2 on the one hand and Figure 3 on the other hand. Thus, for example, it is possible to have a tapered conducting segment as illustrated in Figure 3 with the two brushes rotatable as in Figure 1 in addition to the adjustability of brush 41′ longitudinally of shaft 36. It is also possible to have the construction of Figure 3 modified by providing a movement of the entire holder for brush 41′ angularly around drum 37 as illustrated in Figure 2.

Referring to Figure 3, the brush support 45′ has a rack and pinion arrangement upon which brush 41′ is supported. By turning the pinion upon which brush 41′ is secured, the distance between brushes 40′ and 41′ will be varied. In the practical construction of the modification illustrated in Figure 3, slotted guides on opposite sides of the rack will be provided for supporting the brush holder in any set position. By making the holder for brush 40′ physically separate from the rack and pinion arrangement for brush 41′, the modifications for moving brush 41′ angularly around drum 37 may readily be made.

In the operation of the entire oscillator system, resistor 16 is selected to have a suitable value so that when resistor 15 is shorted, oscillator 10 will supply sufficient energy so that crystal 31 will oscillate at the desired frequency and amplitude. Under such conditions, crystal 31 will have a definite super audible oscillatory output. Resistor 15 is inserted and the value of resistor 15 is adjusted to the point where vacuum tube 10 still oscillates but no output from crystal 31 can be detected after the crystal has come to a steady state. Assuming that motor 35 turns drum 37 at around 1750 revolutions per minute, desirable switching action may be secured with small size components. Thus drum 37 may have a diameter of the order of about 2″ and conducting segment 38 may have a width of the order of about ¼″ or ⅜″. The brushes may be conventional brushes used for small fan motors and may have a diameter of the order of about ⅛″ or 3/16″. It is understood that as many conducting segments may be provided in the surface of drum 37 as may be found necessary, this depending upon the speed of rotation of the drum, the desired number of circuit closures per minute, the physical dimensions of the drum and other factors.

In the modifications so far described, the conducting segment has formed part of a cylindrical surface. It is possible to have the conducting segment form part of a flat disc which is rotated on the disc center. This is similar to motor commutators and slip rings lying in a plane perpendicular to the motor axis. The various modifications previously described may thus be adapted to a rotary disc construction.

Referring to Figure 5, there is shown motor driven insulating member 53 consisting of a flat disc. Insulating member 53 is driven by shaft 54. Insulating member 53 has conducting segment 55. Cooperating with insulating member 53 and conducting segment 55 are brushes 56 and 57. One brush, 57, is carried by segmental gear 58. Gear 58 is coaxial with shaft 54 so that brush 57 may be angularly advanced or retarded with respect to stationary brush 56. If desired, both brushes may be moved, in which case gear 58 should have its axis eccentric of shaft 54.

It is clear that a segment whose angular width tapers corresponding to the structure illustrated in Figure 3 may be provided in the modification illustrated in Figure 5. By providing means for varying the separation between brushes while maintaining the radial alinement of the brushes, a control over the switch closure time will be provided.

What is claimed is:

1. In a therapeutic device for administering super audible wave energy, said device in full operation providing energy at a dangerously high level and requiring full level operation at controlled recurrent time intervals, a super audible frequency electric vacuum tube system including a vacuum tube amplifier having cathode control grid and anode electrodes and circuits connecting the same for generating oscillations at a frequency of the order of about one million cycles per second, means including a crystal in the load circuit of said oscillating system, said crystal being adapted to supply vibratory energy to a patient, said oscillator system including a pair of series-connected resistors in the cathode grid circuit, said two resistors having such a value that the oscillator operates weakly and at an insufficient energy level to supply said crystal, one of said resistors having such a value that when the other resistor is shorted, said one resistor will permit said oscillator to operate vigorously and supply the crystal with rated power and means for short-circuiting said other resistor at intervals, the duration of the short-circuit being small in comparison to the duration of normal circuit conditions whereby the average energy available at the crystal may be accurately controlled.

2. The system according to claim 1 wherein said switching means comprises a motor driven insulating member carrying a conducting segment, a pair of brushes connected across said other resistor, means for securing said brushes to cooperate with said conducting segment so that said conducting segment periodically short-circuits said resistor by providing a metallic path between the brushes and means for varying the length of simultaneous dwell of said brushes upon said conducting segment to control the duration of full oscillations for each switching cycle.

3. The system according to claim 2 wherein said brushes are mounted along a line generally parallel to the axis of rotation of said insulating member and means for varying the spacing between said brushes as measured along a line parallel to the axis of rotation of said insulating member.

4. The system according to claim 3 wherein said insulating member has a generally cylindrical shape.

References Cited in the file of this patent

UNITED STATES PATENTS

| | | |
|---|---|---|
| 1,752,632 | De Beaumont | Apr. 1, 1930 |
| 1,763,272 | Staege | June 10, 1930 |
| 2,099,511 | Caesar | Nov. 16, 1937 |
| 2,283,285 | Pohlman | May 19, 1942 |
| 2,294,411 | Lay | Sept. 1, 1942 |
| 2,433,782 | Murdoch | Dec. 30, 1947 |
| 2,434,497 | Kearsley | Jan. 13, 1948 |
| 2,539,639 | Schoenfeld | Jan. 30, 1951 |
| 2,635,195 | Hancock | Apr. 14, 1953 |
| 2,799,787 | Guttner et al. | July 16, 1957 |